July 21, 1959     D. H. MacDONALD     2,896,084

FLOW METERS

Filed Jan. 22, 1957     2 Sheets-Sheet 1

INVENTOR.
DENNISON H. MAC DONALD
BY
ATTORNEYS

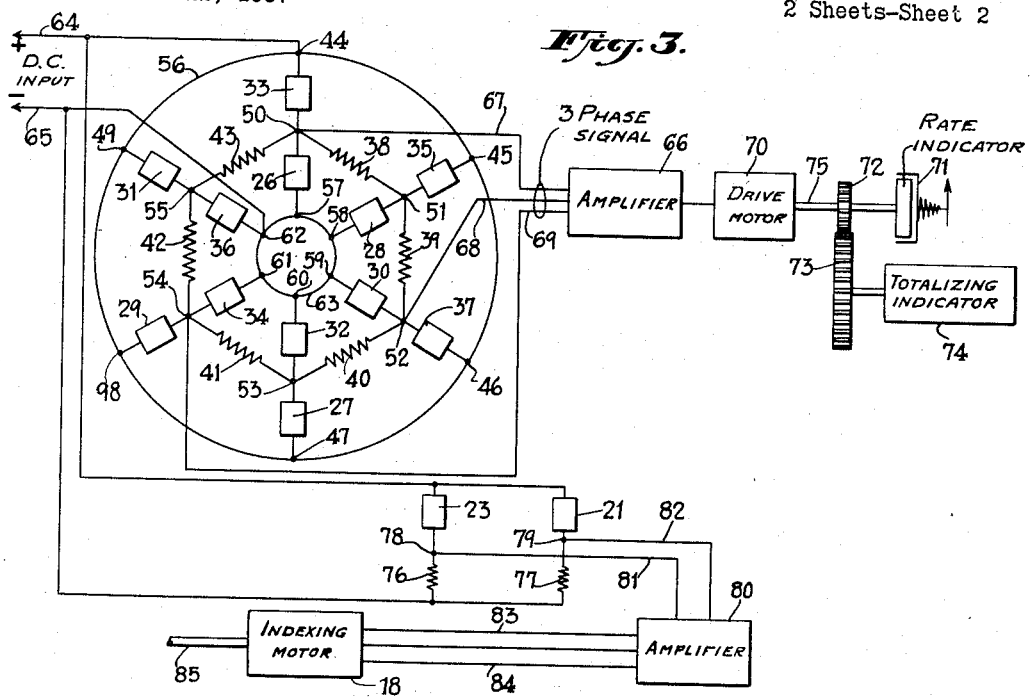

United States Patent Office 2,896,084
Patented July 21, 1959

---

2,896,084

FLOW METERS

Dennison H. MacDonald, East Haven, Conn., assignor to Revere Corporation of America, Wallingford, Conn., a corporation of New Jersey Application January 22, 1957, Serial No. 635,334

13 Claims. (Cl. 250—43.5)

---

The present invention relates to fluid flow rate measuring devices and in particular relates to such devices employing means for generating an electrical voltage which is dependent upon the rate of flow of a fluid.

As described in Patent 2,493,354, it frequently is desirable to operate a remote indicator from a device which is mechanically driven at a rate which is dependent upon the rate of movement of an object, fluid, etc. In one such system for remotely indicating movement, an alternating current is generated by a direct current energized mechanical device having a rotatable member, such as a rotatable shaft, which is rotated at a speed which is dependent upon the rate of movement to be indicated and the frequency of the alternating current is therefore related to the rate of movement. The remote indicator is electrically connected to the mechanical device, and its operation is controlled by the frequency of the alternating current. The remote indicator may, for example, be a synchronous motor.

In many applications it is desirable that the force required to rotate the rotatable member of the mechanical device be kept to a minimum, and therefore, it is desirable that the friction between the rotatable member and the remaining portions of the mechanical device be kept to a minimum. For this reason, as well as for the reason that wear should be kept to a minimum, it is desirable to eliminate rubbing contacts. Furthermore, it is desirable to eliminate contacts completely not only for the foregoing reasons and other difficulties encountered with contacts but also because devices employing contacts produce stepped voltage waveforms.

In many installations, it is desirable to know the weight of fluid which is flowing in a given time rather than merely the speed of flow. Of course, if the speed of flow as well as the density are known, the weight rate of flow can be calculated or the indicating apparatus may be calibrated to indicate weight rate of flow for different fluids having known densities. However, if several different fluids are to be measured, such methods are not completely satisfactory and if the density of the fluid varies from time to time, the indication of weight rate of flow usually is not accurate.

In devices employing a rotor which is rotated by the fluid whose rate of flow is to be measured, the speed of rotation is dependent upon the direction in which the fluid is directed toward the rotor. Thus, if the direction is varied, the speed of rotation may be varied even though the volume per unit time remains constant. On the other hand, if the direction is fixed, the speed of rotation will vary with volume per unit time even though the weight per unit time is constant. In one embodiment of the invention, the direction of flow of the fluid toward the rotor is varied with the density of the fluid so that the speed of rotation of the rotor is related to the weight of fluid which flows per unit time.

In accordance with one embodiment of the invention, a radioactive, ray source is driven by the member which is moved by the fluid whose flow is to be measured and movement of the source changes the output of ray detecting means to provide a voltage which operates a rate indicator. In the preferred form of this embodiment, the source is mounted on a fluid driven rotor and a plurality of ray detecting means are mounted around and spaced from the periphery of the rotor, and the detecting means are electrically interconnected so as to provide a polyphase, preferably three phase, voltage whose frequency is dependent upon the speed of rotation of the rotor. This last-mentioned voltage is employed to control a polyphase motor which operates a suitable indicator.

In accordance with another embodiment of the invention, a radioactive, ray source is employed in conjunction with ray detecting means to control the flow of the fluid toward a member driven by the fluid so that the speed of movement of the member varies with the density of the fluid, and the speed of movement of the member, and hence the weight of fluid per unit time, is indicated by suitable indicating means. Preferably, the speed of movement of the member is indicated as described above so as to provide a compact unit requiring only a small driving force.

It is one object of the invention to provide mechanical means for generating a polyphase voltage whose frequency is related to the speed of rotation of a rotatable member and which requires a relatively small driving force.

It is a further object of the invention to provide fluid flow rate indicating apparatus which is simple and reliable in operation, which requires a relatively small driving force and which has a relatively long life.

It is a further object of the invention to provide fluid flow rate indicating apparatus which indicates the flow of a fluid in terms of weight per unit time and which has the above-mentioned advantages.

Other objects and advantages of the invention will be apparent from the following detailed description of preferred embodiments thereof and from the accompanying drawings which should be considered in connection with the following description and in which:

Fig. 3 is a combined block and electrical circuit diagram of apparatus forming part of the invention and employed for indicating fluid flow by the weight thereof; and Fig. 4 is an enlarged, cross-sectional, elevation view of a modified form of a portion of the apparatus shown in the preceding figures.

Figure 1:
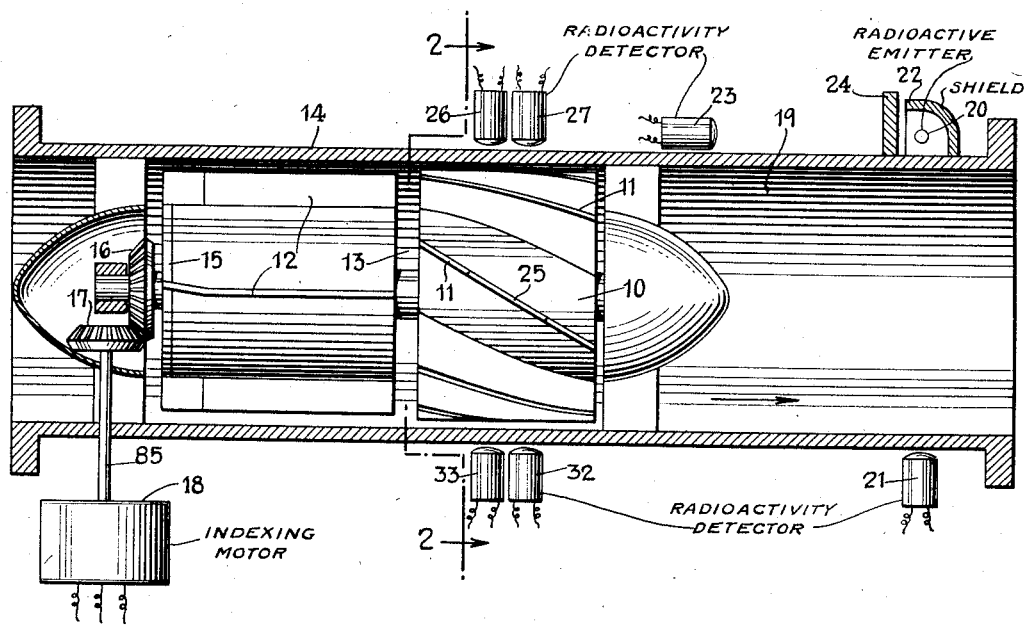
Fig. 1 is a combined diagrammatic and cross-sectional, elevation view of a portion of the preferred embodiment of the invention.

The apparatus shown in Fig. 1 comprises a rotor 10 having a plurality of curved vanes 11 thereon. To the left of the rotor 10, as viewed in Fig. 1, are located a plurality of adjustable directing vanes 12 which direct the flow of fluid toward the rotor 10, the rotor 10 being driven by the fluid as is hereinafter described. The vanes 12 are flexible or are pivotally connected to the portion 13 of the housing 14 and to a rotatable plate or disc 15 which is rotatable by means of a bevel gear 16 which meshes with a bevel gear 17. The bevel gear 17 is mounted on a shaft 85 and is driven by a positioning or indexing motor 18 of any well known type, the indexing motor 18 being controlled as is hereinafter described.

As viewed in Fig. 1, the flow of the fluid whose rate of flow is to be measured is from left to right so that the direction in which the fluid flows toward the rotor 10 is variable by means of adjusting vanes 12. After the fluid passes by the rotor 10, it passes through a chamber 19 within the housing 14. A radioactive, ray source, such as a small bar or mass 20 of a material, such as caesium 137, carbon 14, cobalt 60, strontium 90, thallium 204 or tritium (H-3), is mounted adjacent the chamber 19 so that rays or particles emitted therefrom pass through the chamber 19 and are received by the ray detector 21 which may be of any conventional type and may, for example, be a crystal of cadmium sulphide which provides an output voltage proportional to the intensity of the rays impinging thereon. It will be apparent from the foregoing that the intensity of the rays impinging on the detector 21 will be dependent upon the density of the fluid in the chamber 19 and therefore the output voltage of the detector 21 will vary with the density of the fluid in the chamber 19.

The source 20 is shielded by a shield 22 and the rays or particles emitted therefrom are also received by a reference detector 23 which may be similar to the detector 21. An adjustable ray intercepting plate or shutter 24 is mounted between the source 20 and the detector 23 and is employed to vary the intensity of the rays received at the detector 23 in the manner hereinafter described. The shield 22 and the plate or shutter 24 may be made of metal and may, for example, be made of lead or other ray energy absorbing material.

Figure 2:
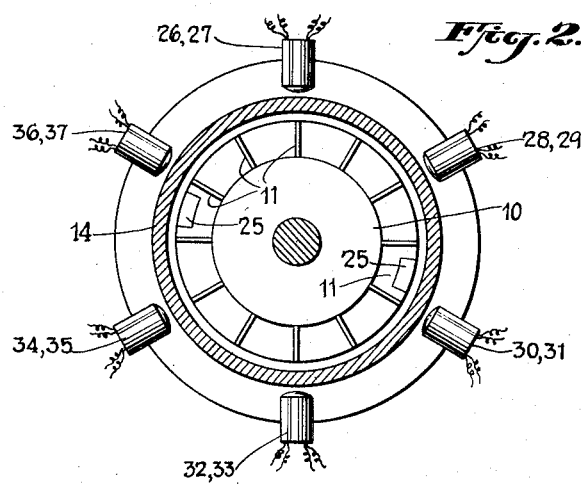
Fig. 2 is a cross-sectional, end elevation view of a portion of the apparatus shown in Fig. 1 and is taken along line 2—2 indicated in Fig. 1.

A second radioactive, ray source 25 in the form of a strip or segment is mounted in the tip of one of the vanes 11, and therefore, the source 25 rotates with the rotor 10. A plurality of pairs of electrical means 26—37 for detecting rays from the source 25 are mounted around the periphery of the rotor 10 and in spaced relation thereto. If the output voltage of the apparatus is to be a three-phase voltage, the number of pairs of detecting means 26—37 is equal in number to an even integral multiple of three and the pairs are mounted in equally spaced relation around the rotor as indicated in Fig. 2. Of course, minor variations in the spacing of the pairs can be tolerated, small unequal spacing merely affecting wave form of the output voltage. Each of the detecting means 26—37 is located in close proximity to the other detecting means of a pair and preferably is spaced, with respect to its associated detecting means, longitudinally of the rotor 10.

Each of the detecting means 26—37 provides an output voltage which is related to the intensity of the rays received from the source 25 and each of the detecting means 26—37 may be similar to the detector 21 above described. As the rotor 10 is rotated, the source 25 successively passes by each of the pairs of detecting means 26—37 and when the source 25 is immediately adjacent one of the detecting means 26—37, the adjacent detecting means provides its maximum output voltage. Also when the source 25 is more remote from a detecting means, the output voltage of the detecting means is smaller so that the output voltage of a detecting means produced by the impingement of the rays from the source 25 thereon varies from a relatively small amount, substantially zero, to a maximum value and then decreases to a relatively small value as the rotor 10 is rotated.

In the preferred embodiment of the invention, the detecting means 26—37 are electrically connected in three-phase relationship in the manner illustrated in Fig. 3. As illustrated in Fig. 3, each of the detecting means of a pair (for example, detecting means 26) is connected in series with one of the pairs of means (for example, detecting means 33) which is electrically 180° out of phase therewith, and, in the embodiment illustrated, is therefore on the diametrically opposite side of the rotor 10. Resistors 38—43 are connected between the junction points of the series connected detecting means 26—37. The terminals 44—49 of one of the series connected detecting means remote from the junction points 50—55 are conductively interconnected such as by a lead or wire 56. The remaining terminals 57—62 of the detecting means 26—37, which are also remote from the junction points 50—55, are conductively interconnected by a lead or wire 63. A direct current source (not shown) is connected by means of leads 64 and 65 to the leads 56 and 63.

Three-phase amplifying means 66 is connected by means of leads 67, 68 and 69 to physically and electrically alternate junction points 50, 52 and 54 so that a three-phase alternate voltage having a frequency which is related to the speed of rotation of the rotor 10 is supplied to the input of the amplifying means 66. The output of the amplifying means 66 is connected to motor means 70 which may, for example, be a three-phase synchronous motor and which may be remotely located with respect to the amplifying means 66. The motor means 70 drives a rate indicating means 71 of a well known type and through the gears 72 and 73 drives totalizing means 74 which provides an indication of the total number of rotations of the shaft 75 of the motor means 70.

It will be apparent from the foregoing that the indicating means 71 indicates the speed of rotation of the shaft 75 and hence the speed of rotation of the rotor 10. Also it will be apparent that the totalizing means 74 provides an indication related to the total number of revolutions of the shaft 75 and hence of the total number of revolutions of the rotor 10.

If the directing vanes 12 illustrated in Fig. 1 were maintained in fixed positions, the speed of rotation of the rotor 10 would be dependent substantially only upon the volume of fluid flowing past the rotor 10 during a given time. It will be apparent therefore that without the modification hereinafter described the indicating means 71 and the totalizing means 74 will indicate substantially only the volume of fluid passing through the housing 14 during a given period of time.

When the fluid passing through the housing 14 is relatively dense and is passing through the housing 14 at a predetermined rate per unit time, the rotor 10 should rotate faster than when a fluid of lower density is passing through the housing 14 at said predetermined rate per unit time if the rate indicating means 71 and the totalizing means 74 are to indicate the weight of the fluid which is passing through the housing 14 during a given time. In order that the indicating means 71 and the totalizing means 74 will indicate the weight of fluid passing through the housing 14 during a given time regardless of the density of the fluid, the vanes 12 are made adjustable and are controlled by the apparatus hereinafter described so that the speed of rotation of the rotor 10 is dependent upon both the volume of fluid and the density of the fluid passing through the housing 14.

Referring to Fig. 3, the detectors 21 and 23 are connected in series with dropping resistors 76 and 77 across the leads 64 and 65 which supply direct current to the apparatus. When the output of the detectors 21 and 23 equal, the voltage between the junction points 78 and 79 will be substantially zero. A fluid of known density may be passed through the housing 14 and hence through the chamber 19 at a known rate and while the fluid is so flowing through the housing 14 the plate or shutter 24, which may be considered a bias control, may be adjusted until the voltage between the junction points 78 and 79 is substantially equal to zero. At the same time the indicating means 71 and the totalizing means 74 may be calibrated. It will be noted that the detector 23 acts as a reference detector whose output will reflect any variation in the output of the source 20 with age or for other reasons.

Subsequently a more dense fluid may be passed through the housing 14 at a known rate and the indicating means 71 and the totalizing means 74 may again be calibrated. When the second fluid is passed through the housing 14, the output of the detector 21 is less than when the previous fluid was passed through the housing 14 and therefore a voltage of a predetermined magnitude and polarity will be developed between the junction points 78 and 79. Such voltage is applied to the input of an amplifying and control means 80 by means of leads 81 and 82. Such amplifying and control means 80 is of a well known type and is connected to the indexing motor 18 by means of leads 83 and 84 to control the position of the shaft 85 thereof which in turn controls the positions of the directing vanes 12. The control of the indexing motor 18 by the amplifying means 80 is, in this case, such as to cause the directing vanes 12 to direct the fluid against the vanes 11 at a greater angle so that the speed of rotation of the rotor 10 will be greater for a given volume rate of flow of the fluid.

Conversely, a fluid of low density may be passed through the housing 14 at a predetermined rate and such fluid will cause a greater output from the detector 21 than was obtained when the previously mentioned known fluids were passed through the housing 14. This will cause a voltage to appear between the junction points 78 and 79 of a predetermined magnitude but of opposite polarity to that produced when the fluid of highest density was passed through the housing 14. Such voltage will cause operation of the indexing means 18 and alteration of the positions of the vanes 12 so that the fluid strikes the vanes 11 at a sharper angle and so that the speed of rotation of the rotor 10 for the given volume rate of flow is reduced.

It will be seen from the foregoing that by suitable calibration of the indicating means 71 and the totalizing means 74 the apparatus described in connection with Figs. 1-3 may be employed to indicate the rate of flow of a fluid through the housing 14 both in weight per unit time and weight during a given period of time.

If it is not desired to indicate the rate of flow of a fluid through the housing 14 in units of weight, the apparatus for adjusting the directing vanes 12 in accordance with the density of the fluid may be omitted, and the housing and the parts enclosed thereby may take the form illustrated in Fig. 4. As illustrated in Fig. 4, the housing 14a may be shorter because of the elimination of the chamber 19 and the directing vanes 12a may be fixed in position. The rotor 10 may be identical with the rotor 10 illustrated in Fig. 1 and may comprise vanes 11, one of which carried the radioactive, ray source 25. The detecting means 26—37 are mounted around and are spaced from the rotor 10 in the manner described in connection with Figs. 1 and 2. As viewed in Fig. 4, the fluid whose rate of flow is to be measured passes from left to right through the housing 14a. The detecting means 26—37 may be connected as described in connection with Fig. 3.

When the apparatus shown in Fig. 4 is connected as described in connection with Fig. 3, the indicating means 71 and totalizing means 74 will indicate the rate of flow of the fluid through the housing 14a in terms of volume per unit time and total volume during a predetermined period, although it will be understood that if a fluid of a known density and which is substantially constant in density, is to be passed through the housing 14a, the indicating means 71 and the totalizing means 74 may be calibrated in terms of weight per unit time and total weight of the fluid.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a radioactive, ray source mounted adjacent said chamber, electrical means for detecting rays from said source mounted with a portion of said chamber between said detecting means and said source, and electrical amplifying means connected to said detecting means and to said vane adjusting means for controlling said adjusting means in accordance with the output of said detecting means.

2. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a radioactive, ray source mounted adjacent said chamber, first electrical means for detecting rays from said source mounted adjacent said source, adjustable ray intercepting means mounted between said source and said first means, second electrical means for detecting rays from said source mounted with a portion of said chamber between said second means and said source, and means interconnecting said first and said second means and said vane adjusting means for controlling said adjusting means in accordance with the outputs of said first and said second means, whereby the speed of rotation of said rotor is increased for a predetermined rate of flow of said fluid when the density of said fluid is increased.

3. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a radioactive, ray source mounted adjacent said chamber, first electrical means for detecting rays from said source mounted adjacent said source, adjustable ray intercepting means mounted between said source and said first means, second electrical means for detecting rays from said source mounted with a portion of said chamber between said second means and said source, and electrical amplifying means connected to said first and said second means and responsive to the difference in electrical outputs of said first and said second means, said amplifying means also being connected to said vane adjusting means for controlling said adjusting means in accordance with the outputs of said first and said second means, whereby the speed of rotation of said rotor is increased for a predetermined rate of flow of said fluid when the density of said fluid is increased.

4. Fluid flow rate indicating apparatus comprising a rotor adapted to be driven by said fluid, a housing enclosing said rotor and having a chamber therein for receiving said fluid, a first radioactive, ray source mounted adjacent said chamber, first electrical means for detecting rays from said source mounted with a portion of said chamber between said second means and said source, means responsive to said first means, a second radioactive ray source mounted on said rotor, said second source being rotatable with said rotor, a plurality of second electrical means for detecting rays from said second source, and flow measuring means connected to said second means and responsive thereto.

5. Fluid flow rate indicating apparatus comprising a rotor adapted to be driven by said fluid, a housing enclosing said rotor and having a chamber therein for receiving said fluid, a first radioactive, ray source mounted adjacent said chamber, first electrical means for detecting rays from said source mounted with a portion of said chamber between said second means and said source, a second radioactive ray source mounted on said rotor, said second source being rotatable with said rotor, a plurality of second electrical means for detecting rays from said second source, and flow measuring means responsive to both said first means and said second means.

6. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a first radioactive, ray source mounted adjacent said chamber, first electrical means for detecting rays from said source mounted with a portion of said chamber between said second means and said source, means interconnecting said first means with said vane adjusting means for controlling said adjusting means in accordance with the electrical outputs of said first means, a second radioactive ray source mounted on said rotor, said second source being rotatable with said rotor, a plurality of second electrical means for detecting rays from said second source, and flow measuring means connected to said second means and responsive thereto.

7. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a first radioactive, ray source mounted adjacent said chamber, first electrical means for detecting rays from said source mounted adjacent said source, adjustable ray intercepting means mounted between said source and said first means, second electrical means for detecting rays from said source mounted with a portion of said chamber between said second means and said source, means interconnecting said first and said second means with said vane adjusting means for controlling said adjusting means in accordance with the electrical outputs of said first and said second means, a second radioactive ray source mounted on said rotor, said second source being rotatable with said rotor, a plurality of pairs of third electrical means for detecting rays from said second source, means electrically connecting said third means in three phase relationship, and rate measuring means and totalizing means connected to said third means and responsive thereto.

8. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a first radioactive, ray source mounted adjacent said chamber, first electrical means for detecting rays from said source mounted adjacent said source, adjustable ray intercepting means mounted between said source and said first means, second electrical means for detecting rays from said source mounted with a portion of said chamber between said second means and said source, means interconnecting said first and said second means with said vane adjusting means for controlling said adjusting means in accordance with the electrical outputs of said first and said second means, a second radioactive ray source mounted on said rotor, said second source being rotatable with said rotor, a plurality of pairs of third electrical means for detecting rays from said second source, said pairs of third means being equal in number to an even integral multiple of three and being mounted in equally spaced relation around said rotor, means electrically connecting diametrically opposite one of said third means in series with each other, means including resistors electrically connecting said third means in three phase relationship, and rate measuring means and totalizing means connected to said third means and responsive thereto.

9. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a first radioactive, ray source mounted adjacent said chamber, first electrical means for detecting rays from said source mounted adjacent said source, adjustable ray intercepting means mounted between said source and said first means, second electrical means for detecting rays from said source mounted with a portion of said chamber between said second means and said source, electrical amplifying means connected to said first and said second means and responsive to the difference in electrical outputs of said first and said second means, said amplifying means also being connected to said vane adjusting means for controlling said adjusting means in accordance with the outputs of said first and said second means, whereby the speed of rotation of said rotor is increased for a predetermined rate of flow of said fluid when the density of said fluid is increased, a second radioactive, ray source mounted on said rotor, said second source being rotatable with said rotor, a plurality of pairs of third means for detecting rays from said second source, said pairs of third means being equal in number to an even integral multiple of three and being mounted in equally spaced relation around said rotor means electrically connecting each of said third means in series with one of said third means which is on the diametrically opposite side of said rotor, resistors connected between the junction points of said series connected third means, means electrically interconnecting the terminal of one of said series connected third means remote from its junction point with the terminals of one of each of the remaining series connected third means remote from their junction points, means electrically interconnecting the remaining terminals of said third means remote from their junction points, and indicating means connected to the junction points of physically alternate ones of said third means.

10. Fluid flow rate indicating apparatus comprising a rotor adapted to be driven by said fluid, adjustable directing vanes mounted adjacent said rotor for controlling the flow of said fluid toward said rotor, a housing enclosing said rotor and said vanes and having a chamber therein for receiving said fluid, electrically operable vane adjusting means connected to said vanes, a first radioactive, ray source mounted adjacent said chamber, first electrical means for detecting rays from said source mounted adjacent said source, adjustable ray intercepting means mounted between said source and said first means, second electrical means for detecting rays from said source mounted with a portion of said chamber between said second means and said source, electrical amplifying means connected to said first and said second means and responsive to the difference in electrical outputs of said first and said second means, said amplifying means also being connected to said vane adjusting means for controlling said adjusting means in accordance with the outputs of said first and said second means, whereby the speed of rotation of said rotor is increased for a predetermined rate of flow of said fluid when the density of said fluid is increased, a second radioactive, ray source mounted on said rotor, said second source being rotatable with said rotor, a plurality of pairs of third electrical means for detecting rays from said second source, said pairs of third means being equal in number to an even integral multiple of three and being mounted in equally spaced relation around said rotor, means electrically connecting each of said third means in series with one of said third means which is on the diametrically opposite side of said rotor, resistors connected between the junction points of said series connected third means, first connecting means electrically interconnecting the terminal of one of said series connected third means remote from its junction point with the terminals of one of each of the remaining series connected third means remote from their junction points, second connecting means electrically interconnecting the remaining terminals of said third means remote from their junction points, a direct current source connected between said first and said second connecting means, three phase electrical amplifying means connected to the junction points of physically alternate ones of said third means, motor means connected to said last-mentioned amplifying means and responsive thereto, and motor speed measuring means and motor rotation totalizing means connected to said motor means and driven thereby.

11. Means for generating a polyphase voltage comprising a rotor, a radioactive, ray source mounted on said rotor, said source being rotatable with said rotor, a plurality of electrical means for detecting rays from said source, said detecting means being mounted in spaced relation around said rotor, and means electrically connecting each of said detecting means in polyphase relationship.

12. Means for generating a polyphase voltage having a frequency related to the speed of rotation of a rotor comprising a rotor, a radioactive, ray source mounted on said rotor, said source being rotatable with said rotor, a plurality of pairs of electrical means for detecting rays from said source, said pairs of means being mounted in spaced relation around said rotor, means electrically connecting each of said detecting means in series with one of said detecting means which is electrically 180 degrees out-of-phase therewith, resistors connected between the junction points of said series connected detecting means, first connecting means electrically interconnecting the terminal of one of said series connected detecting means remote from its junction point with the terminals of one of each of the remaining series connected detecting means remote from their junction points, second connecting means electrically interconnecting the remaining terminals of said detecting means remote from their junction points, and means for supplying direct current to said first and said second connecting means.

13. Means for generating a three-phase voltage having a frequency related to the speed of rotation of a rotor comprising a rotor, a radioactive, ray source mounted on said rotor, said source being rotatable with said rotor, a plurality of pairs of electrical means for detecting rays from said source, said pairs of means being equal in number to an even integral multiple of three and being mounted in equally spaced relation around said rotor, means electrically connecting each of said detecting means in series with one of said detecting means which is on the diametrically opposite side of said rotor, resistors connected between the junction points of said series connected detecting means, first connecting means electrically interconnecting the terminal of one of said series connected detecting means remote from its junction point with the terminals of one of each of the remaining series connected detecting means remote from their junction points, second connecting means electrically interconnecting the remaining terminals of said detecting means remote from their junction points, and a direct current source connected between said first and said second connecting means.

References Cited in the file of this patent

UNITED STATES PATENTS

| | | |
|---|---|---|
| 2,671,174 | Burgholz | Mar. 2, 1954 |
| 2,683,813 | Friedman | July 13, 1954 |
| 2,692,951 | Voelker | Oct. 26, 1954 |
| 2,709,366 | Potter | May 31, 1955 |
| 2,745,969 | Keller | May 15, 1956 |